US012768375B2

(12) United States Patent
Diehl et al.

(10) Patent No.: US 12,768,375 B2
(45) Date of Patent: Oct. 20, 2026

(54) HYDRAULIC SYSTEM HAVING AN INERTIA CHARGING ARRANGEMENT

(71) Applicant: Robert Bosch GmbH, Stuttgart (DE)

(72) Inventors: Jim E. Diehl, Lehighton, PA (US); Oliver Gerhard, Zellingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/990,816

(22) Filed: Dec. 20, 2024

(65) Prior Publication Data

US 2026/0177086 A1 Jun. 25, 2026

(51) Int. Cl.
*F15B 21/14* (2006.01)
*F15B 11/024* (2006.01)

(52) U.S. Cl.
CPC ............ *F15B 21/14* (2013.01); *F15B 11/024* (2013.01); *F15B 2211/20561* (2013.01); *F15B 2211/20592* (2013.01); *F15B 2211/613* (2013.01)

(58) Field of Classification Search
CPC .................... F15B 11/024; F15B 21/14; F15B 2211/20561; F15B 2211/20592; F15B 2211/613
See application file for complete search history.

(56) References Cited

U.S. PATENT DOCUMENTS

| | | | | |
|---|---|---|---|---|
| 5,794,441 | A * | 8/1998 | Lisniansky | F04B 49/08 60/451 |
| 6,527,540 | B1 * | 3/2003 | Dantlgraber | B29C 45/67 425/589 |
| 9,290,912 | B2 * | 3/2016 | Wen | F15B 13/06 |
| 10,760,246 | B2 * | 9/2020 | Hijikata | E02F 9/2292 |
| 2001/0035011 | A1 * | 11/2001 | Endo | E02F 9/2217 60/414 |
| 2013/0227938 | A1 * | 9/2013 | Mueller | F15B 1/02 60/327 |
| 2013/0236272 | A1 * | 9/2013 | Gassner | F15B 7/008 414/803 |
| 2023/0258206 | A1 * | 8/2023 | Amic | F15B 7/006 60/414 |
| 2024/0084829 | A1 * | 3/2024 | Guender | F15B 7/006 |

FOREIGN PATENT DOCUMENTS

| | | | | |
|---|---|---|---|---|
| CN | 112483491 A * | 3/2021 | | F15B 21/14 |
| CN | 119084375 A * | 12/2024 | | F15B 21/008 |
| DE | 102014109153 A1 * | 12/2015 | | F16H 61/44 |
| EP | 2843241 B1 * | 7/2018 | | F15B 3/00 |
| WO | WO-2013080633 A1 * | 6/2013 | | E02F 9/2292 |

* cited by examiner

*Primary Examiner* — Thomas E Lazo
(74) *Attorney, Agent, or Firm* — Maginot, Moore & Beck LLP

(57) ABSTRACT

A hydraulic drive includes a hydraulic circuit having a hydraulic machine, a hydraulic consumer, a first hydraulic line, and a second hydraulic line. The hydraulic drive further includes an inertia charging arrangement having a hydraulic motor configured, in response to a power failure of the hydraulic drive, to receive hydraulic fluid from a high-pressure line of the first and second hydraulic lines and to expel hydraulic fluid to a low-pressure line of the first and second hydraulic lines, and a hydraulic pump operably connected to the hydraulic motor such that the hydraulic motor drives the hydraulic pump. The hydraulic pump is configured to pump hydraulic fluid from a reservoir into the low-pressure line.

19 Claims, 2 Drawing Sheets

HYDRAULIC SYSTEM HAVING AN INERTIA CHARGING ARRANGEMENT

FIELD

This disclosure relates generally to hydraulic systems, and, more particularly, to inertia charging arrangements for hydraulic systems.

BACKGROUND

A closed loop hydraulic circuit is designed to minimize hydraulic fluid losses by utilizing a hydraulic loop between the pump and actuator or motor. Over time, the hydraulic circuit may lose hydraulic fluid by, for example, leakage. Conventional hydraulic circuits include a charge circuit configured to replace the lost fluid, and in some cases to maintain positive pressure on components in the hydraulic circuit.

During a sudden power failure in the hydraulic circuit, if the actuator or motor is attached to a mass with a large inertia, the actuator or motor will continue to move until friction or other mechanical interaction bring the actuator or motor to a stop. During this power off condition, certain hydraulic components rely on the charge pressure, and it is desirable to maintain the charge pressure during the power off condition.

In conventional hydraulic circuits, a hydraulic accumulator in the charge circuit is used to maintain the charge pressure during a power failure. However, using a hydraulic accumulator can be disadvantageous when the inertia of the actuator or motor is typically relatively large, and/or it requires a substantial amount of time to stop. In this scenario, a very large accumulator is required to supply sufficient volume to maintain the charge pressure for long enough to safely stop the actuator or motor. Such an accumulator can be very expensive, and can require substantial regular maintenance.

What is needed, therefore, are improvements in closed-loop hydraulic charge systems that improve the maintenance of the charge pressure during a power failure.

SUMMARY

In some aspects, the techniques described herein relate to a hydraulic drive including a hydraulic circuit including a hydraulic machine with a first port and a second port, a hydraulic consumer having a first side and a second side, a first hydraulic line connecting the first port to the first side, and a second hydraulic line connecting the second port to the second side. The hydraulic drive further includes an inertia charging arrangement including a hydraulic motor configured, in response to a power failure of the hydraulic drive, to receive hydraulic fluid from a high-pressure line of the first and second hydraulic lines and to expel hydraulic fluid to a low-pressure line of the first and second hydraulic lines, and a hydraulic pump operably connected to the hydraulic motor such that the hydraulic motor drives the hydraulic pump. The hydraulic pump is configured to pump hydraulic fluid from a reservoir into the low-pressure line.

In some aspects, the techniques described herein relate to an inertia charging arrangement for a hydraulic drive, including a hydraulic motor configured, in response to a power failure of the hydraulic drive, to receive hydraulic fluid from a high-pressure line of the hydraulic drive and to expel hydraulic fluid to a low-pressure line of the hydraulic drive, and a hydraulic pump operably connected to the hydraulic motor such that the hydraulic motor drives the hydraulic pump. The hydraulic pump is configured to pump hydraulic fluid from a reservoir into the low-pressure line.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
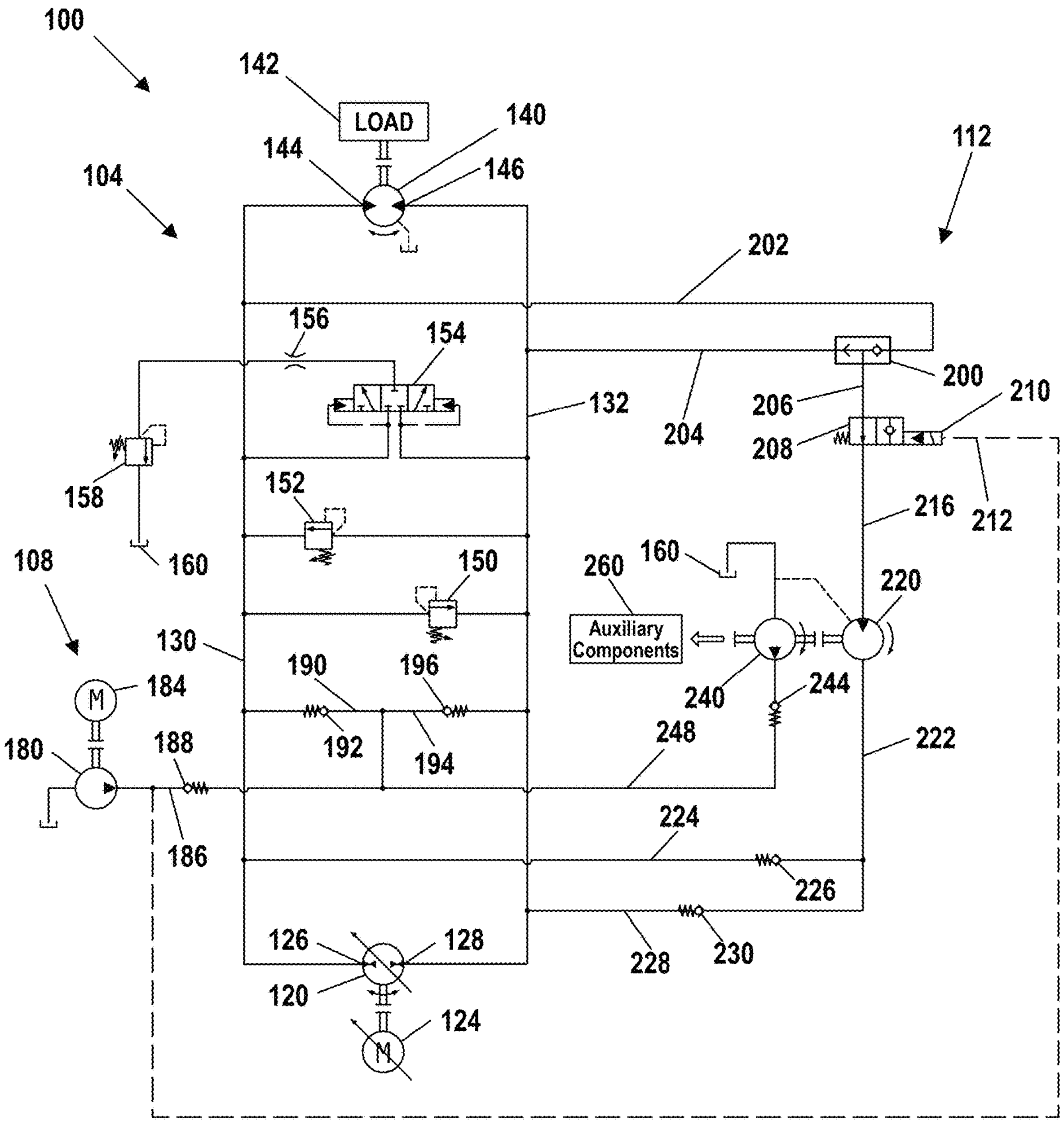
FIG. 1 is a schematic diagram of a hydraulic drive having an inertia charging arrangement according to the disclosure.

FIG. 1 depicts a schematic diagram of a hydraulic drive 100 (also referred to as a hydraulic unit) having a hydraulic circuit 104 configured as a closed loop hydraulic circuit, a charge pump arrangement 108, and an inertia charging arrangement 112. In particular, the inertia charging arrangement 112 is configured to use inertial energy in the system to produce a charge pressure flow to the hydraulic circuit 104 in the event of a mechanical or electrical failure of the system.

The hydraulic circuit 104 includes a hydraulic machine 120, in particular a variable hydraulic pump or a pump/motor (i.e., a hydraulic machine configured to act both as a hydraulic pump and as a hydraulic motor), which is driven by a drive motor 124 (which, in embodiments using a hydraulic pump/motor, can be operated both as a motor and as a generator). In some embodiments, the variable hydraulic machine 120 is a fixed displacement pump or pump/motor. The drive motor 124 may be an internal combustion engine, an electric motor, a hybrid motor, or another desired driving arrangement.

The hydraulic machine 120 includes a first port 126 and a second port 128, which are respectively connected to a first hydraulic line 130 (also referred to as the A side) and a second hydraulic line 132 (also referred to as the B side) of the hydraulic circuit 104. The hydraulic machine 120 may be, for example, an axial piston machine with a variable swing angle or variable displacement. The variable swing angle or variable displacement of the hydraulic machine 120 is adjustable through zero, i.e., the direction of the volumetric flow of the hydraulic fluid (typically a hydraulic oil) through the hydraulic machine 120 is reversible, while the direction of rotation of a drive shaft of the hydraulic machine 120 or drive motor 124 remains unchanged, so that, via corresponding control, the hydraulic fluid flows from the first hydraulic line 130 (the A side) to the second hydraulic line 132 (the B side), or from the second hydraulic line 132 (the B side) to the first hydraulic line 130 (A side).

In embodiments with a non-variable hydraulic machine (e.g., constant hydraulic machine) having a fixed swing angle or fixed displacement, the hydraulic machine 120 is drivable at a variable rotational speed, and in particular in different directions of rotation. As a result, at a fixed swing angle or fixed displacement, the direction of the volumetric flow of the hydraulic fluid (typically a hydraulic oil) can be changed by the rotational speed driving the hydraulic machine 120, given a variable direction of rotation of the drive shaft of the hydraulic machine 120 or the drive motor 124, so that the volumetric flow takes place from the A side to the B side or from the B side to the A side. It is also noted that the pressure of the hydraulic fluid in the first hydraulic line 130 is also referred to as the first line pressure or A pressure, and the pressure of the hydraulic fluid in the second hydraulic line 132 is also referred to as the second line pressure or B pressure.

Figure 2:
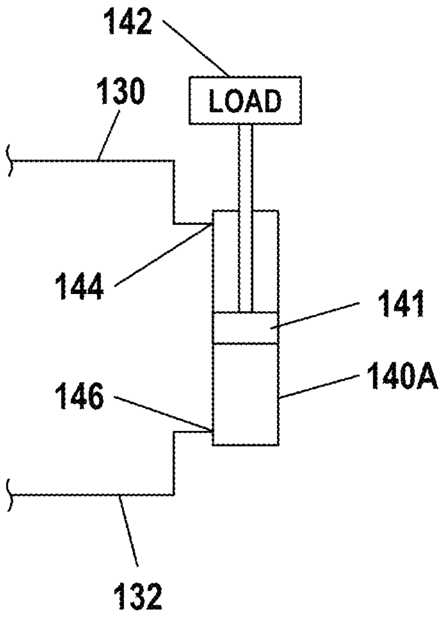
FIG. 2 is a schematic diagram of a hydraulic cylinder for the hydraulic drive of FIG. 1.

The hydraulic circuit 104 pressurizes a hydraulic consumer, which, in the embodiment of FIG. 1, is a hydraulic motor 140 that is drivable in forward or reverse directions and is mechanically connected to a load 142, which may be for example a conveyor, drive wheels or tracks, an implement, an external power take-off, or the like. In another embodiment, the hydraulic consumer may instead be a double-acting hydraulic cylinder 140A (FIG. 2) with a piston 141 that is connected to at least one load 142 and is also drivable in forward or reverse directions. Referring back to FIG. 1, the hydraulic circuit 104 is configured to selectively pump hydraulic fluid via the first hydraulic line 130 to a first side 144 (A side) of the hydraulic consumer while simultaneously diverting hydraulic fluid from a second side 146 (B-side) of the hydraulic consumer via the second hydraulic line 132, and pump the hydraulic fluid via the second hydraulic line 132 to the second side 146 of the hydraulic consumer via the second hydraulic line 132 while simultaneously diverting hydraulic fluid from the first side 144 of the hydraulic consumer via the first hydraulic line 130. Accordingly, depending on the direction of flow of the hydraulic machine 120, one of the first hydraulic line 130 and the second hydraulic line 132 is a low-pressure line and the other is a high-pressure line.

The hydraulic circuit 104 further includes a first pressure relief valve 150 and a second pressure relief valve 152, which are configured to open to relieve excess pressure from the high-pressure one of the first and second hydraulic lines 130, 132, respectively, to the low-pressure one of the first and second hydraulic lines 130, 132 when the pressure in the high-pressure line exceeds a threshold value. The pressure threshold at which the pressure relief valves 150, 152 open can be adjustable or configurable. Additionally, a flushing flow valve 154 is arranged so as to flush fluid via a flushing flow speed control orifice 156 and a charge pressure relief or pressure setting valve 158 to a reservoir 160, which may be internal or external to the hydraulic drive 100.

The charge pump arrangement 108 includes a charge pump 180 driven by an associated motor 184, which may be an electric motor, internal combustion engine, or the like. In some embodiments, charge pump 180 does not include a dedicated motor, and it is instead driven by the drive motor 124. The charge pump 180 is configured to supply hydraulic fluid to the low pressure side of the hydraulic circuit 104 via a charging line 186, which includes a check valve 188 that disables backflow to the charge pump 180, and via a first charging branch line 190, which is connected to the first hydraulic line 130 via a first check valve 192, and a second charging branch line 194, which is connected to the second hydraulic line 132 via a second check valve 194.

The inertia charging arrangement 112 includes a shuttle selector valve 200, which is connected to the first hydraulic line 130 by a first inflow branch line 202 and to the second hydraulic line 132 by a second inflow branch line 204. The shuttle selector valve 200 connects the one of the first and second inflow branch lines 202, 204 that is connected to the high-pressure line of the first and second hydraulic lines 130, 132 to an inflow line 206 that flows into a system start valve 208.

The system start valve 208 is a normally open valve with a valve actuator 210 that may be either an electrical actuator that is electrically actuated to a closed position or a hydraulic actuator that is controlled into the closed position by the hydraulic pressure in the charging line 186, which may be connected to the valve actuator 210 via a pilot line 212. Thus, when the hydraulic drive 100 is operating normally, the electrical power operating the hydraulic drive 100 actuates the valve actuator 210 to close the system start valve 208 or, alternatively, the pressure produced by the charge pump 180, which is in constant operation during normal operation, actuates the valve actuator 210 to close the system start valve 208.

A hydraulic line 216 is arranged downstream of the system start valve 208 and connects the system start valve 208 with an hydraulic motor 220. When the system start valve 208 is open because of a failure in the hydraulic drive 100, the hydraulic fluid in the high pressure side drives the hydraulic motor 220, and the hydraulic fluid is then returned to the low pressure side via a hydraulic line 222, a first branch line 224, which is connected to the first hydraulic line 130 and includes a check valve 226 to disable backflow from the first hydraulic line 130, and a second branch line 228, which is connected to the second hydraulic line 132 and includes a check valve 230 to disable backflow from the second hydraulic line 132.

The hydraulic motor 220 is operably connected to an hydraulic pump 240. In some embodiments, the hydraulic motor 220 may be mechanically connected to the hydraulic pump 240 such that the output shaft of the hydraulic motor 220 is directly or indirectly (e.g. via gearing) connected to the input shaft of the hydraulic pump 240. When the hydraulic motor 220 is being driven by the high pressure fluid, the hydraulic motor 220 drives the hydraulic pump 240, which pumps hydraulic fluid from a reservoir, for example the reservoir 160 or another hydraulic fluid reservoir, through a check valve 244 and an inertia charge line 248 into the first and second charging branch lines 190, 194 and, via the respective check valves 192, 196, into the low pressure one of the first hydraulic line 130 and second hydraulic line 132. In another embodiment, the hydraulic motor 220 and the hydraulic pump 240 may be electrically linked by, for example, a generator that produces electrical power from the rotation of the hydraulic motor 220 and delivers the electrical power to an electric motor that drives the hydraulic pump 240.

During normal operation of the hydraulic drive 100, the drive motor 124 drives the hydraulic machine 120 to move hydraulic fluid through the hydraulic circuit 104 in the desired direction to drive the hydraulic motor 140 or move the hydraulic cylinder 140A. The charge pump arrangement 108 introduces hydraulic fluid into the hydraulic circuit 104 to replace any fluid lost during use by, for example, leakage.

When a power failure occurs, however, the drive motor 124 and the hydraulic machine 120 stop, producing a blocked condition in the hydraulic circuit 104. As a result, the hydraulic fluid can no longer flow from the high pressure one of the first hydraulic line 130 and second hydraulic line 132 to the low pressure one. This blocked condition can be a function of the hydraulic machine 120, such as a volumetric pump control moving to a zero position, or closing of a safety blocking valve in the hydraulic machine 120. Once closed, the inertia from the load 142 on the hydraulic motor 140 forces fluid through the first or second pressure relief valve 150, 152 in the direction from the high-pressure line to the low-pressure line, resulting in maximum system pressure on the high-pressure side of the hydraulic circuit 104. The hydraulic motor 140 continues to rotate until the inertial energy is dissipated via transfer through the first or second pressure relief valve 150, 152.

During the inertial dissipation, the fluid from the high pressure one of the first and second hydraulic lines 130, 132 is directed via the respective one of the first and second inflow branch lines 202, 204 to the shuttle selector valve 200, opening the high pressure one of the first and second hydraulic lines 130, 132 to the inflow line 206 of the inertia charging arrangement 112. The valve actuator 210, if electrically actuated, loses power in response to the power failure, and therefore the valve actuator 210 allows the system start valve 208 to open. Alternatively, if the valve actuator 210 is hydraulically controlled, the power failure causes the charge motor 184 to deactivate, which results in the charge pump 180 no longer operating. The pressure in the charging line 186, which is connected to the valve actuator 210 via the pilot line 212, is no longer sufficient to keep the normally open system start valve 208 closed, and the system start valve 208 therefore opens in response to the power failure.

Thus, since the system start valve 208 opens in response to the power failure, the high pressure one of the first and second hydraulic lines 130, 132 is connected to the inlet of the hydraulic motor 220 via the associated one of the first and second inflow branch lines 202, 204, the shuttle selector valve 200, the inflow line 206, the system start valve 208, and the hydraulic line 216. The outlet side of the hydraulic motor 220 is connected to the first and second hydraulic lines 130, 132 via the hydraulic line 222 and the associated one of the first and second branch lines 224, 228. The check valve 226, 230 in the one of the first and second branch lines 224, 228 connected to the low-pressure side of the hydraulic circuit 104 opens due to the higher pressure in the hydraulic line 222, thereby bypassing the blocked hydraulic machine 120 and completing the circuit between the first and second hydraulic lines 130, 132 and.

The hydraulic motor 220 produces a torque due to the pressure differential between the high pressure and low pressure sides of the hydraulic circuit 104. Since the output shaft of the hydraulic motor 220 is operably connected to the input shaft of the hydraulic pump 240, the inertia induced torque on the hydraulic motor 220 causes the hydraulic pump 240 to rotate. The torque causes the hydraulic pump 240 to draw hydraulic fluid from the reservoir 160, which opens the check valve 244 such that the hydraulic fluid flows into the inertia charge line 248.

The pressurized hydraulic fluid in the inertia charge line 248 is blocked from flowing in to the charging line 186 by the check valve 188, and therefore the hydraulic fluid flows into the first and second charging branch lines 190, 194 and opens the one of the check valves 192, 196 that is associated with the low-pressure line of the hydraulic circuit 104. The open check valve 192, 196 thereby allows positive flow from the hydraulic pump 240 to the low pressure one of the first and second hydraulic lines 130, 132 to replace the lost flow from the charge pump 180.

As a result, the inertia charging arrangement 112 of the hydraulic drive 100 allows for the inertia of the load 142 to be dissipated safely through the circuit produced in a condition where the charge pump 180 is inoperable. Further, the hydraulic motor 220, which drives the hydraulic pump 240, replaces leakage flow during the dissipation of the inertia, allowing for proper functioning of the hydraulic drive 100 during the power failure.

The flow rate and pressure of the inertia charging arrangement 112 is a function of the ratio of displacement between the hydraulic motor 220 and the hydraulic pump 240. A displacement ratio, defined as the motor displacement divided by the pump displacement, that is higher will result in higher charge pressure at lower charge flow, while a lower displacement ratio results in higher charge flow at lower pressure. In particular, the hydraulic motor 220 and hydraulic pump 240 may be selected based on the component requirements of the hydraulic circuit 104 and its operating parameters. In addition, the overall size of the hydraulic motor 220 and hydraulic pump 240 combination may be selected such that the hydraulic pump 240 produces sufficient pressure and fluid flow to compensate for pressure and flow lost via the flushing flow valve 154, flushing flow speed control orifice 156, and pressure relief or pressure setting valve 158, and the overall sum of drain leakage from the components in the hydraulic circuit 104 to the reservoir 160.

In some embodiments, the hydraulic motor 220 and/or the hydraulic pump 240 may be mechanically or electrically connected to auxiliary components 260 to supply mechanical work for additional functions in the event of failure of the hydraulic drive 100. The auxiliary components 260 may include, for example, an alarm, a back-up power generator configured to generate electrical power for power control circuits, and/or a braking system.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A hydraulic drive comprising:

a hydraulic circuit comprising a hydraulic machine having a first port and a second port;

a hydraulic consumer having a first side and a second side;

a first hydraulic line connecting the first port to the first side; and a second hydraulic line connecting the second port to the second side;

an inertia charging arrangement comprising:

a hydraulic motor configured, in response to a power failure of the hydraulic drive, to receive hydraulic fluid from a high-pressure line of the first and second hydraulic lines and to expel hydraulic fluid to a low-pressure line of the first and second hydraulic lines; and a hydraulic pump operably connected to the hydraulic motor such that the hydraulic motor drives the hydraulic pump, the hydraulic pump configured to pump hydraulic fluid from a reservoir into the low-pressure line.

2. The hydraulic drive of claim 1, wherein the hydraulic motor is mechanically connected to the hydraulic pump so as to drive the hydraulic pump.

3. The hydraulic drive of claim 2, further comprising:

a charge pump arrangement having a charge pump hydraulically connected to the hydraulic circuit and configured to pump hydraulic fluid into the hydraulic circuit.

4. The hydraulic drive of claim 3, wherein the inertia charging arrangement includes a shuttle valve configured to fluidly connect the hydraulic motor to the high-pressure line.

5. The hydraulic drive of claim 4, wherein the inertia charging arrangement includes a system start valve arranged between the shuttle valve and the hydraulic motor and configured to open in response to the power failure to fluidly connect the hydraulic motor to the high-pressure line.

6. The hydraulic drive of claim 5, wherein the system start valve is configured as a normally open valve with an actuator that is actuated into a closed position during normal operation of the hydraulic drive.

7. The hydraulic drive of claim 6, wherein the actuator is electrically actuated.

8. The hydraulic drive of claim 6, wherein the actuator is hydraulically actuated to the closed position by a pressure generated by the charge pump.

9. The hydraulic drive of claim 6, wherein the charge pump is configured to pump hydraulic fluid into a charging line, which is connected to the first and second hydraulic lines via respective first and second branch lines, each of which includes a check valve.

10. The hydraulic drive of claim 9, wherein an outlet of the hydraulic pump is fluidly connected to the charging line via a pump outlet check valve.

11. The hydraulic drive of claim 10, wherein the hydraulic motor is fluidly connected to the first and second hydraulic lines by respective first and second branch lines, each of which includes a check valve.

12. The hydraulic drive of claim 1, wherein the hydraulic motor is operably connected to at least one auxiliary component.

13. The hydraulic drive of claim 12, wherein the at least one auxiliary component includes at least one of an alarm, a back-up power generator, or a braking system.

14. An inertia charging arrangement for a hydraulic drive, comprising:

a hydraulic motor configured, in response to a power failure of the hydraulic drive, to receive hydraulic fluid from a high-pressure line of the hydraulic drive and to expel hydraulic fluid to a low-pressure line of the hydraulic drive; and a hydraulic pump operably connected to the hydraulic motor such that the hydraulic motor drives the hydraulic pump, the hydraulic pump configured to pump hydraulic fluid from a reservoir into the low-pressure line.

15. The inertia charging arrangement of claim 14, further comprising a shuttle valve configured to fluidly connect the hydraulic motor to the high-pressure line.

16. The inertia charging arrangement of claim 15, further comprising a system start valve arranged between the shuttle valve and the hydraulic motor and configured to open in response to the power failure to fluidly connect the hydraulic motor to the high-pressure line.

17. The inertia charging arrangement of claim 16, wherein the system start valve is configured as a normally open valve with an actuator that is actuated into a closed position during normal operation of the hydraulic drive.

18. The inertia charging arrangement of claim 17, wherein the actuator is electrically actuated into the closed position during normal operation of the hydraulic drive.

19. The inertia charging arrangement of claim 17, wherein the actuator is hydraulically actuated to the closed position by a pressure generated by a charge pump of the hydraulic drive during normal operation of the hydraulic drive.

* * * * *